United States Patent Office 2,850,528
Patented Sept. 2, 1958

2,850,528

ORGANOMETALLIC COMPOUNDS

Rex D. Closson, Northville, Mich., assignor to Ethyl Corporation, New York, N. Y., a corporation of Delaware No Drawing. Application June 21, 1954
Serial No. 438,357

5 Claims. (Cl. 260—541)

This invention relates to novel compositions of matter and in particular to novel organometallic compounds in which the α-carbon atom of a metal salt of an organic acid is substituted with a metal.

Certain α-metallic substituted organic salts have been set forth in the literature. In particular, α-sodio-sodium caproate has been reported as being formed when reacting sodium caproate concurrently with sodium and amyl chloride in benzene. These workers produced butyl malonic acid along with caproic acid when passing carbon dioxide through the above reaction mixture. Another compound which has been reported as being an intermediate in this process is α-sodio-sodium phenyl acetate. To the best of my knowledge, these investigators have not isolated, nor have they made any attempt to determine particular characteristics of these compounds except for their probable formation as intermediates in the preparation of the substituted malonic acids. In addition, other workers have suggested the formation of α-sodio-ethyl acetate by the reaction of triphenylmethyl sodium with ethyl acetate. These prior art compounds have the particular disadvantage of being unstable under atmospheric conditions and at elevated temperatures. As a result of my work in this field, I have discovered novel compositions of matter which possess unexpected stability and are of particular benefit to the art as a basic raw material in the preparation of various chemicals.

It is an object of the present invention to provide new and novel compositions of matter. A particular object is to provide α-metallo-metallic salts of organic acids, particularly acetic acid. A still more specific object of this invention is to provide the novel composition α-sodio-sodium acetate. These and other objects will be apparent as the discussion proceeds.

The above and other objects are accomplished by providing novel α-metallo-metallic salts of organic acids. The novel products I especially prefer are the α-metallo-metallic acetates. Thus, these compounds are compounds in which the ionic structure

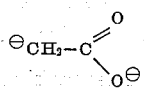

is satisfied by mono or polyvalent metallic ions. My novel compositions can be depicted by the formula

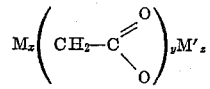

wherein M and M' can be the same or different and are monovalent or polyvalent metallic elements, and $x$, $y$, and $z$ are small whole numbers which can be the same or different. The metallic elements can have valences of 1 to 4 inclusive, and $x$, $y$, and $z$ can be 1 to 4 inclusive. It will be evident that the values of $x$, $y$, and $z$ will depend upon the valences of the metallic elements, M and M'. The metallic elements preferred are mono and divalent elements, particularly the alkali and alkaline earth metals, especially sodium. Thus, a particularly preferred compound of my invention is α-sodio-sodium acetate. In certain instances, one or both of the remaining hydrogen atoms on the α-carbon atom can be substituted with lower alkyl radicals, especially those having 3 carbon atoms or less, and these compounds will likewise exhibit the superior characteristics of the structure containing only 2 carbon atoms.

The novel compositions of my invention have the characteristic of being stable under atmospheric conditions and at elevated temperatures, especially the α-sodio-sodium acetate. The stability of the α-metallo-metallic acetates surprisingly is superior to that of the α-sodio-sodium caproate and the α-sodio-ethyl acetate compounds of the prior art. Another particular advantage of this invention is that it provides α-metallo-metallic organic salts essentially free of other organometallic compounds which cannot be readily separated therefrom and hinder, by competing reactions, many processes in which they can be employed. Consequently, my compounds are of considerably more utility in various reactions and in fact can be handled in air without the danger of rapid decomposition. Some hydrolysis of my compounds is caused by moisture in air, although this hydrolysis is quite slow.

The following examples describe methods of preparing my compounds and certain physical characteristics.

*Example I*

To a container flushed with nitrogen was added 7.8 parts of finely divided sodium amide and 24.6 parts of finely divided anhydrous sodium acetate. The mixture was agitated in order to obtain a uniform distribution of particles. From the container the mixture was fed intermittently over a period of one hour to a reaction vessel previously heated to a temperature of about 180° C. which was also flushed with nitrogen. The reaction vessel was equipped with means for agitation and inlet and outlet ports. The feed to the vessel was such that the temperature was maintained between 180 and 235° C. and the reaction mixture was continuously agitated. Ammonia was evolved. The ammonia was absorbed in a 2 N solution of hydrogen chloride. At the completion of the addition to the reactor, the ammonia evolution had essentially ceased and the heat was removed. The product α-sodio-sodium acetate, free of other organometallic compounds, remained in the reaction vessel and was recovered therefrom. Titration of the hydrogen chloride solution indicated a yield of product of 89.5% based on the sodium amide.

*Example II*

This run was conducted essentially the same as that described above wherein the same quantity of sodium amide was employed, 40 parts of sodium acetate was employed, and the temperature varied between 173 to 240° C. The total reaction time was 40 minutes. Determination of the amount of ammonia absorbed in the hydrogen chloride solution indicated a yield of greater than 99% based on the sodium amide. The product remaining in the reaction vessel was white and did not decompose upon heating to 375° C.

To establish the identity of the product, 38.6 parts of n-octyl bromide were added to the product obtained in Example II, and about 50 parts of n-nonane were added as a diluent to the mixture. This mixture was refluxed for about 6 hours and solids which formed were filtered off. The solid product was dissolved in water and acidified. A yellow oil then separated which was extracted with ether three times. A yellow product, decanoic acid, was recovered by evaporating the ether therefrom. This product melted at about 27° C., whereas decanoic acid melts at 31° C. A portion of this acid was treated with thionyl chloride and then with aniline in benzene solution. The solid material obtained after removal of the benzene was recrystallized and found to have a melting point of 61.5 to 62.5° C., whereas the melting point of the anilide of decanoic acid is reported to be 62° C. A second portion of the acid was treated with an excess of thionyl chloride and then with anhydrous ammonia in benzene solution. The ammonium chloride was removed by filtration and the benzene evaporated. The crystalline product remaining was twice recrystallized from methanol. The resulting product had a melting point between 97.2 and 98.4° C., whereas the melting point of capric amide is reported in the literature as being 98° C. Thus, it has been established that α-sodio-sodium acetate was prepared.

*Example III*

α-Lithio-sodium acetate is prepared by reacting essentially stoichiometric quantities of lithium amide with anhydrous sodium acetate.

*Example IV*

α-Sodio-potassium acetate is prepared by reacting anhydrous potassium acetate with sodium amide essentially as described in Example I at a temperature of about 250° C. Reaction proceeds smoothly to produce the product in good yield and purity.

*Example V*

α-Sodio-zinc acetate is prepared in good yield by reacting sodium amide with anhydrous zinc acetate according to the procedure of Example I.

*Example VI*

High-purity α-bario-cerous acetate is obtained by reacting barium amide with anhydrous cerous acetate at about 280° C.

*Example VII*

When zinc amide is reacted with dehydrated lead acetate essentially as described in Example I, α-zinc-lead acetate is produced.

It will be evident that other α-metallo-metallic salts can be prepared by using the appropriate starting materials. As pointed out above, I prefer the α-metallo-metallic compounds in which the metallic elements are alkali or alkaline earth metals as, for example, sodium, potassium, lithium, rubidium, cesium, calcium, barium, strontium, magnesium, and beryllium. Thus, among the novel compositions of this invention are, for example, α-lithio-lithium acetate; α-lithio-sodium acetate; α-lithio-potassium acetate; α-lithio-rubidium acetate; α-lithio-cesium acetate; α-sodio-potassium acetate; α-sodio-rubidium acetate; α-sodio-cesium acetate; α-potassio-rubidium acetate; α-potassio-cesium acetate; α-rubidio-cesium acetate; α-potassio-potassium acetate; α-rubidio-rubidium acetate; α-cesio-cesium acetate; α-beryllio-beryllium acetate; α-beryllio-magnesium acetate; α-beryllio-calcium acetate; α-beryllio-strontium acetate; α-beryllio-barium acetate; α-magnesio-calcium acetate; α-magnesio-strontium acetate; α-magnesio-barium acetate; α-calcio-strontium acetate; α-calcio-barium acetate; α-strontio-barium acetate; α-magnesio-magnesium acetate; α-calcio-calcium acetate; α-strontio-strontium acetate; and α-bario-barium acetate. Other novel compositions of my invention are α-sodio-beryllium acetate; α-sodio-magnesium acetate; α-sodio-calcium acetate; α-sodio-strontium acetate; and α-sodio-barium acetate. Likewise, compounds in which the other alkali metals—that is, lithium, potassium, etc., replace "sodio" in the latter examples, will be evident as being among my novel compositions. In addition, other novel compositions include, for example, α-calcio-sodium acetate and the like compounds in which the "calcio" is replaced with other alkaline earth metals and the "sodium" is replaced with other alkali metals.

The foregoing examples are the compositions which I prefer. I especially prefer α-sodio-sodium acetate primarily because of the greater availability and reactivity of sodium.

Other compounds encompassed by this invention are, for example, α-sodio-aluminum acetate; α-potassio-cadmium acetate; α-calcio-cerous acetate; α-lithio-chromium acetate; α-cesio-cupric acetate; α-sodio-ferrous acetate; α-sodio-lead acetate; α-potassio-manganese acetate; α-sodio-mercuric acetate; α-potassio-nickel acetate; α-sodio-silver acetate; α-sodio-thallium acetate; α-sodio-titanium acetate; α-potassio-zinc acetate; and the like α-metallo-metallic acetates.

The novel compositions of this invention have the unique characteristic of being stable. As pointed out, α-sodio-sodium acetate does not decompose even at temperatures above about 375° C. Consequently, these unique materials are of particular benefit to the art in that they provide a comparatively basic chemical from which various compounds can be readily obtained. For example, when the compounds of this invention are reacted with organic halides, the metallic salt of an organic acid is obtained which can be readily converted to the acid itself. Likewise, these novel compositions can be reacted with organic dihalides in order to produce, upon subsequent hydrolysis, various dibasic acids which find particular utility in the art as, for example, in the formation of various polymeric materials. These and other uses will be evident to those skilled in the art.

Having thus described the novel compositions of my invention, what I claim is:

1. A stable white solid which is an alpha-metallo-metallic acetate essentially free of other organo-metallic compounds and containing two carbon atoms wherein the alpha-metallo element is selected from the group consisting of alkali metals, alkaline earth metals and zinc.

2. As compositions of matter, stable α-metallo-metallic acetates containing two carbon atoms wherein the alpha-metallo element is an alkaline earth metal.

3. The combination of claim 1 in which the α-metallo element is an alkali metal.

4. A stable white solid which is alpha-sodio-sodium acetate essentially free of other organometallic compounds.

5. The composition of claim 1 wherein the other metallic element is selected from the group consisting of alkaline earth metals, cerium, zinc and lead.

No references cited.

UNITED STATES PATENT OFFICE
CERTIFICATE OF CORRECTION

Patent No. 2,850,528                        September 2, 1958

Rex D. Closson

It is hereby certified that error appears in the printed specification of the above numbered patent requiring correction and that the said Letters Patent should read as corrected below.

Column 3, line 7, for "620 C." read -- 62° C. --; column 4, line 61, strike out "No references cited."

and under the heading     OTHER REFERENCES insert -- Morton et al.: J. A. C. S., vol. 60, pages 1426-9 (1938) --.

Signed and sealed this 16th day of December 1958.

(SEAL)
Attest:

KARL H. AXLINE
Attesting Officer

ROBERT C. WATSON
Commissioner of Patents